June 9, 1936. H. H. BLASE 2,043,730
SPECTACLES
Filed June 25, 1934 2 Sheets-Sheet 1
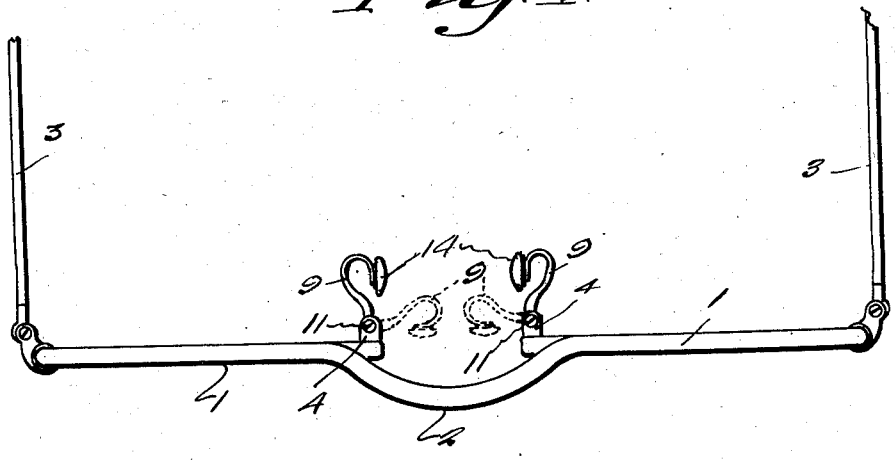
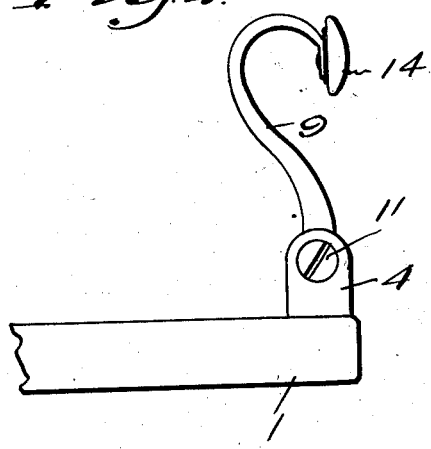
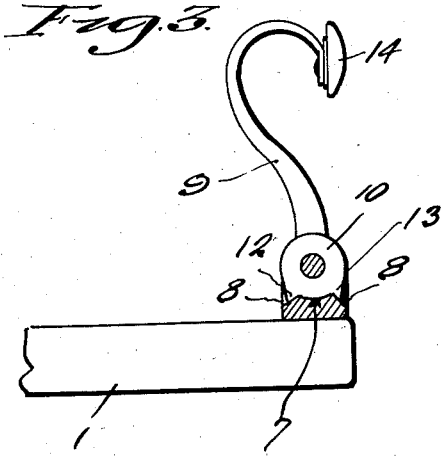
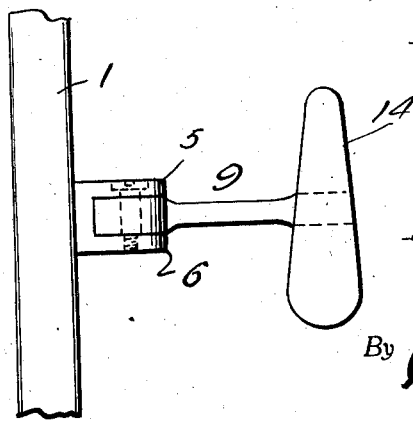
Inventor
Harry H. Blase
By Clarence A. O'Brien
Attorney

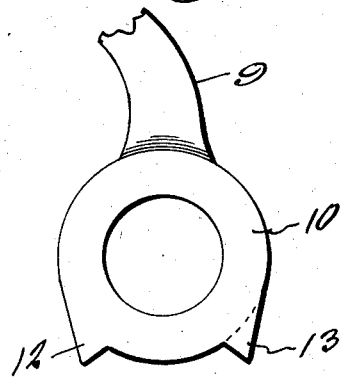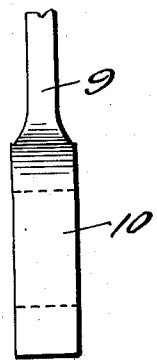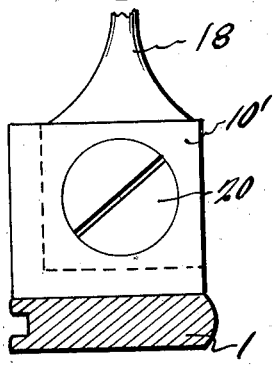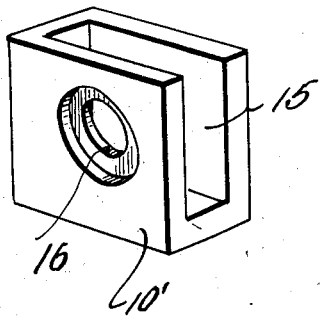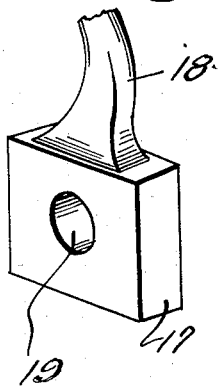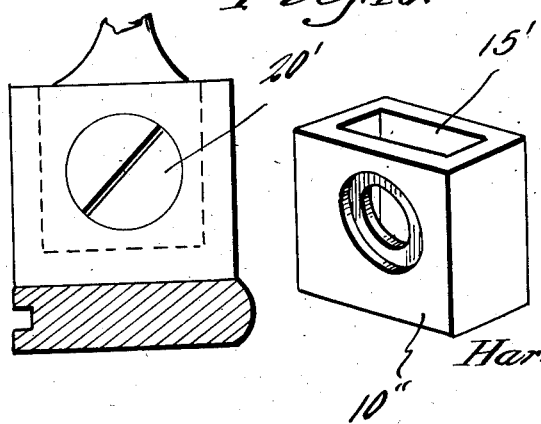

Patented June 9, 1936

2,043,730

UNITED STATES PATENT OFFICE 2,043,730

SPECTACLES

Harry H. Blase, Wilkes-Barre, Pa.

Application June 25, 1934, Serial No. 732,348

1 Claim. (Cl. 88—48)

This invention relates to spectacles or eye glasses, the present invention being an improvement on that shown in my application Serial No. 665,227, filed April 8, 1933, and which issued into Patent No. 1,965,277. The general object of this invention is to provide means whereby the nose rests or guards can be readily attached to the lens frames in a removable manner so that different sizes and types of nose guards can be used with the spectacles in accordance with the wishes or requirements of the user.

Another object of this invention is to provide means for holding the guards stationary but permitting the guards to be made to swing or fold, when desired, by simply removing a small projection on the base of each guard.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a top plan view of the spectacles constructed in accordance with this invention and showing the operative position of the guards in full lines and with the guards folded in dotted lines.

Figure 2 is a fragmentary top plan view showing how a guard is connected with the frame.

Figure 3 is a similar view but with the lug in section.

Figure 4 is a view looking toward nasal end of a lens frame.

Figure 5 is a top plan view of the base part of a guard.

Figure 6 is an edge view of Figure 5.

Figure 7 is a top plan view with parts in section showing another type of lug for supporting a guard.

Figure 8 is a perspective view of said lug.

Figure 9 is a perspective view of the base part of the guard used with the lug shown in Figure 8.

Figure 10 is a view similar to Figure 7 but showing another form of lug.

Figure 11 is a perspective view of this form of lug.

As shown in Figure 1 the spectacles comprise the frames 1 for holding the lenses, the bridge 2 connecting the frames together and the temples 3. In carrying out my invention I provide an inwardly extending lug 4 on the nasal end of each frame, each lug being of forked construction to provide the upper prong 5 and the lower prong 6 with the central part of the lug between the prongs having a curved wall 7 and its ends beveled as shown at 8. The shank 9 of each nose guard has a substantially ring-shaped part 10 at one end thereof which fits between the prongs and a screw 11 passes through the prongs and through the ring-shaped part, the head of the screw being countersunk in the upper prong 5 and threaded in the lower prong 6 as shown in Figure 4. A pair of projections 12 and 13 is formed on the ring-shaped part, as shown in Figure 5, to engage the beveled ends 8, as shown in Figure 3 to prevent movement of the shank but if it is desired to have the shanks swing so that they be moved to the dotted line position shown in Figure 1, the projection 13 can be filed off as shown by the dotted lines in Figure 5. If this is done the shanks can be moved from the full line position in Figure 1 to the dotted line position and when in the full line position the shanks will be prevented from moving outwardly or away from each other by the stop or projection 12.

The nose engaging member shown at 14 is made in the form of an elongated pad and it is suitably connected to the hook end of the shank, as shown in Figure 3.

Figures 7, 8 and 9 show modified means for connecting each shank to a frame and in this case each lug 10' is of substantially block-like form and is provided with a recess 15 which opens out through one side edge and one end edge as shown in Figure 8 with the screw opening 16 passing vertically through the upper and lower parts formed by the recess. The base 17 of each shank 18 is of substantially rectangular shape to fit snugly in the recess 15 and has a hole 19 therein for receiving the screw 20 which passes through the holes 16 in the lug 10' and through the hole 19 in the base 17, the head of the screw being countersunk in the upper part of the lug as shown in Figure 7.

Figures 10 and 11 show another modification in which the lug 10" is of block-like form but the recess 15' simply opens out through the free end edge of the lug. The base of the guard is also of block-like form to fit in the recess 15' and these parts have holes therein to receive the countersunk screw 20' as shown in Figures 10 and 11. In the modified forms of the invention the guards are stationary but they can be readily removed and replaced by other types or sizes of guards.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

An eye glass construction, in combination, lens supporting members, a bridge connecting said members together in spaced relation, a stud connected to the nasal end of each member below the horizontal plane of the bridge and each stud extending inwardly beyond the inner face of said member and each stud having a horizontal substantially rectangular-shaped recess therein opening out through the free end and one side edge of the stud, a pair of nose guard shanks, each of elongated form and having substantially all parts lying in the same horizontal plane with its base of substantially rectangular shape and fitting snugly in the recess, a vertically arranged screw passing through each stud and the base of each shank, a nose pad attached to the free end of each shank and portions of the walls of the recess contacting the two faces and two edge walls of the base of the shank for preventing turning movement of the shank on the screw.

HARRY H. BLASE.